UNITED STATES PATENT OFFICE.

ANTON BRANY, OF ALPHA, NEW JERSEY.

MANUFACTURING OF ARTIFICIAL STONE.

934,710.  Specification of Letters Patent.  Patented Sept. 21, 1909.

No Drawing.  Application filed October 7, 1908.  Serial No. 456,599.

*To all whom it may concern:*

Be it known that I, ANTON BRANY, a citizen of the United States, residing at Alpha, in the county of Warren and State of New Jersey, have invented certain new and useful Improvements for the Manufacturing of Artificial Stone, of which the following is a specification.

My invention relates to a new process for the production of artificial stone, and it consists in combining certain ingredients in certain proportions, as will be hereinafter fully set forth and briefly stated in the claims.

The main object of the invention is to produce an artificial stone possessing certain advantages and superior qualities, which will well adapt it for use of building constructions, monuments, bridge-piers, grave-stones, billiard and pool-table slabs, wall decorations, pavements, door-steps, tiling, window- and door ornaments, mantel-pieces, &c.

The process of manufacturing my new composition is carried out as follows—I take of Portland cement 80 pounds to which by continual stirring or agitation I add of equal proportions half saturated salt water and saturated lime water in all 20 pounds. The addition of the salt water and the lime water with the Portland cement produces the artificial stone which is the subject of my invention, but it is found many times to be desirable to give the stone mottling, coloring, and the like, and if such is desired the coloring matter is added with or at the same time the mixed lime and salt water is added.

The mortar or plastic mass produced by the above mixture is now placed in molds of any desired shape or form in the usual manner and permitted to stand therein until it becomes set and crystallized.

The normal temperature of the mortar is preferably from 42 to 46 degrees Fahrenheit at the time of molding. Through chemical action during the crystallization period, which lasts from 6 to 8 hours, the temperature of the mass will rise to from 110 to 116 degrees Fahrenheit according to the mold capacity.

It is desirable to permit the articles to remain in the mold from 10 to 16 hours until it again assumes the temperature of the surrounding atmosphere, after which it is taken from the mold and placed in the dry room in the usual manner and kept there for about four days when the desired and required quality of hardness is reached.

The sudden and remarkable rise in temperature of the mass from 42 or 46 degrees Fahrenheit to 110 to 116 degrees Fahrenheit demonstrates that the process employed is original and new and that the material produced by such chemical action is a new substance.

The above-described new composition is remarkable for hardness, cohesion and resistance to fracture, and will take a polish or luster equal to any of the high grade natural stones ordinarily employed for ornamental purposes. The stone so produced is also found to be insoluble in water, acids and alkali, and that when immersed with water it becomes more hard therefrom. The material will also withstand a very high degree of heat or cold which makes it desirable for building and other structural uses.

I claim:—

1. The process of manufacturing artificial stone consisting in employing Portland cement, equal parts of half saturated salt water and saturated lime water, stirring the cement and adding the salt and lime water to the required consistency, molding the mass and allowing the molded mass to crystallize.

2. The process of manufacturing artificial stone consisting in employing Portland cement, equal parts of half saturated salt water and saturated lime water, stirring the cement adding the salt and lime water, adding with the stirring a desired coloring matter, molding the mass and allowing the molded mass to crystallize.

3. The process of manufacturing artificial stone consisting in employing 80 pounds of Portland cement, 20 pounds equal parts of half saturated salt water and saturated lime water, stirring the cement, adding the salt and lime water, molding the mass and allowing the molded mass to crystallize.

ANTON BRANY.

Witnesses:
　LOUIS HAGY,
　JOSEPH BEASEY.